(12) United States Patent
Appelo et al.

(10) Patent No.: US 8,828,341 B1
(45) Date of Patent: Sep. 9, 2014

(54) SULFITE CONTROL TO REDUCE MERCURY RE-EMISSION

(71) Applicant: ALSTOM Technology Ltd, Baden (CH)

(72) Inventors: Per-Erik Albert Appelo, Knoxville, TN (US); Dennis James Laslo, Ten Mile, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/945,156

(22) Filed: Jul. 18, 2013

(51) Int. Cl.
- *B01D 53/64* (2006.01)
- *B01D 53/77* (2006.01)
- *B01D 53/78* (2006.01)
- *B01D 53/79* (2006.01)

(52) U.S. Cl.
CPC ....................... *B01D 53/64* (2013.01)
USPC ........... 423/210; 423/108; 423/110; 423/111; 423/168

(58) Field of Classification Search
CPC ........ B01D 53/64; B01D 53/77; B01D 53/78; B01D 53/79
USPC .................... 423/210; 422/108, 110, 111, 168
See application file for complete search history.

(56) References Cited

U.S. PATENT DOCUMENTS

| | | | |
|---|---|---|---|
| 3,961,020 A | 6/1976 | Seki | |
| 4,502,872 A | 3/1985 | Invester et al. | |
| 4,889,698 A | 12/1989 | Moller et al. | |
| 5,435,980 A | 7/1995 | Felsvang et al. | |
| 5,505,766 A | 4/1996 | Chang | |
| 5,527,496 A | 6/1996 | Rogers et al. | |
| 5,556,447 A | 9/1996 | Srinivasachar et al. | |
| 5,569,436 A | 10/1996 | Lerner | |
| 5,672,323 A | 9/1997 | Bhat et al. | |
| 5,854,173 A | 12/1998 | Chang et al. | |
| 6,027,551 A | 2/2000 | Hwang et al. | |
| 6,322,613 B1 | 11/2001 | Wojtowicz et al. | |
| 6,451,094 B1 | 9/2002 | Chang et al. | |
| 6,521,021 B1 | 2/2003 | Pennline et al. | |
| 6,558,454 B1 | 5/2003 | Chang et al. | |

(Continued)

FOREIGN PATENT DOCUMENTS

| | | |
|---|---|---|
| DE | 102004044291 | 3/2006 |
| EP | 0 253 563 | 1/1988 |

(Continued)

OTHER PUBLICATIONS

The abstract of MX PA 00003024 A published on Mar. 8, 20002.*

(Continued)

*Primary Examiner* — Timothy Vanoy
(74) *Attorney, Agent, or Firm* — Rita D. Vacca

(57) ABSTRACT

A method for reducing mercury emission and/or re-emission in cleaned flue gas through control of sulfite concentration within a wet flue gas desulfurization (WFGD) system is disclosed. One method for reducing mercury emission and/or re-emission through control of sulfite concentration is to measure the sulfite concentration of an aqueous alkaline slurry used in a WFGD system and comparing the same to a predetermined sulfite concentration value. If the comparison reveals the measured sulfite concentration is above the predetermined values, the amount of oxidation air supplied to the system is increased. If the comparison reveals the measured sulfite concentration is below the predetermined values, the amount of oxidation air supplied to the system is decreased.

12 Claims, 1 Drawing Sheet

(56) References Cited

U.S. PATENT DOCUMENTS

| | | |
|---|---|---|
| 6,719,828 B1 | 4/2004 | Lovell et al. |
| 6,818,043 B1 | 11/2004 | Chang et al. |
| 6,848,374 B2 | 2/2005 | Srinivasachar et al. |
| 6,878,358 B2 | 4/2005 | Vosteen et al. |
| 7,033,548 B2 | 4/2006 | Pahlman et al. |
| 7,153,481 B2 | 12/2006 | Bengtsson et al. |
| 7,361,209 B1 | 4/2008 | Durham et al. |
| 8,632,742 B2 * | 1/2014 | Keiser et al. .................. 423/210 |
| 2002/0150516 A1 | 10/2002 | Pahlman et al. |
| 2003/0103882 A1 | 6/2003 | Biermann et al. |
| 2003/0206843 A1 | 11/2003 | Nelson, Jr. |
| 2004/0003716 A1 | 1/2004 | Nelson, Jr. |
| 2004/0086439 A1 | 5/2004 | Vosteen et al. |
| 2011/0014104 A1 | 1/2011 | Ghorishi et al. |
| 2011/0262326 A1 * | 10/2011 | Steen et al. .................. 423/210 |

FOREIGN PATENT DOCUMENTS

| | | | |
|---|---|---|---|
| EP | 1040864 A2 * | 10/2000 | ............. B01D 53/64 |
| EP | 1 275 430 | 1/2003 | |
| EP | 1 645 323 | 4/2006 | |
| WO | WO 03/093518 | 10/1993 | |
| WO | WO 93/20926 | 11/2003 | |
| WO | WO 2004/108254 | 12/2004 | |
| WO | WO 2013/050990 | 4/2013 | |

OTHER PUBLICATIONS

The abstract of EP 1,040,864 A3 published on Dec. 19, 2001.*
Todd R Carey; "Assessing sorbent injection mercury control effectiveness in flue gas streams" Environmental Progress, American Institute of Chemical Engineers, US, vol. 19, No. 3, 2000, pp. 167-174, XP002336971.
John Tarabocchia, PE; Mercury Separation from Flue Gas and Scrub Water with Trimercapto-s-triazine (TMT) Control/Tracking No. 03-A-15-AWMA (17 pages).
European Search Report—EP Application No. 05021227.3, dated Feb. 17, 2006.

* cited by examiner

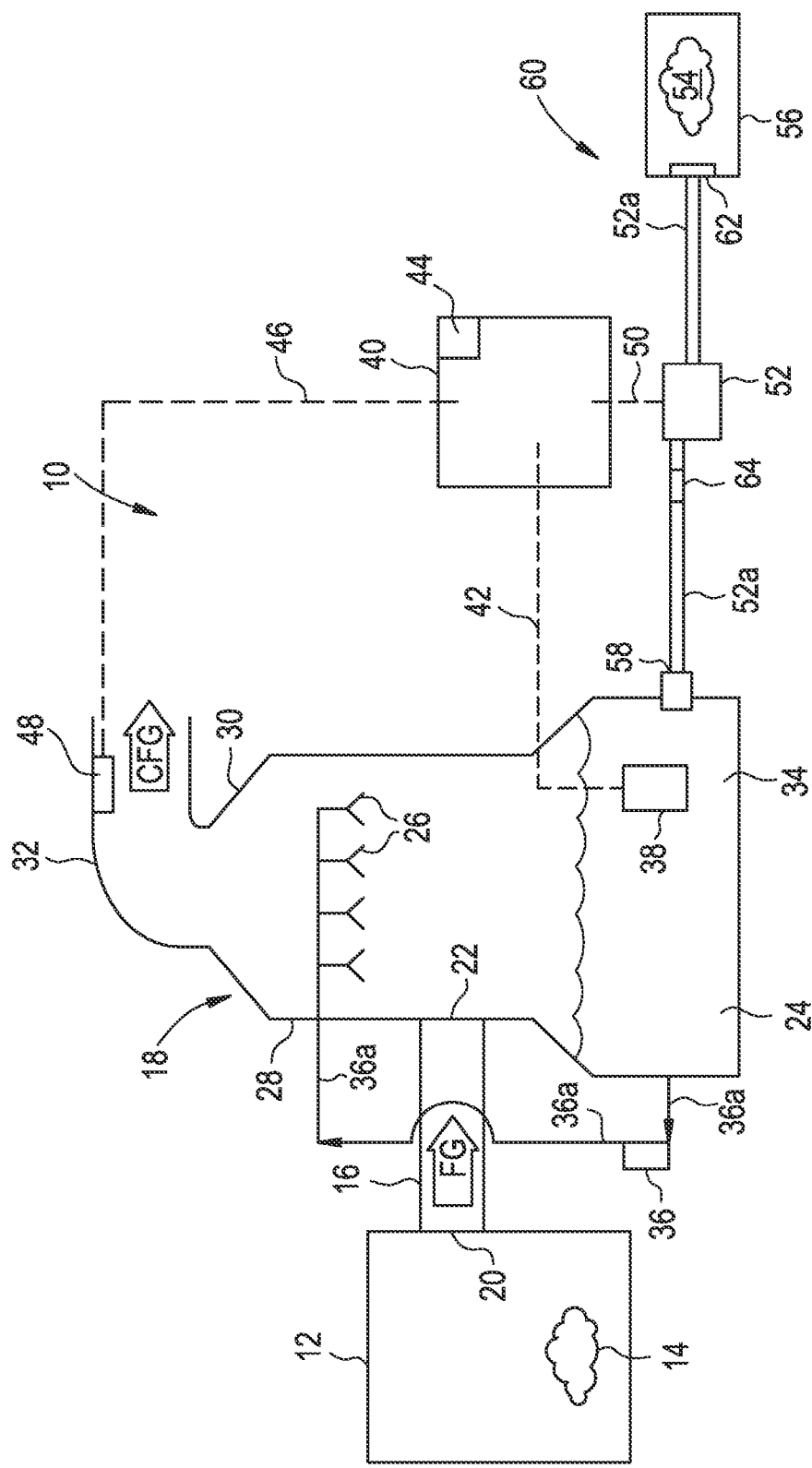

SULFITE CONTROL TO REDUCE MERCURY RE-EMISSION

FIELD OF THE INVENTION

The subject matter disclosed herein generally relates to reducing an amount of mercury discharged to an environment incident to combustion of a fuel source containing mercury or mercury compounds, and more specifically to reducing mercury emission and/or re-emission in a combustion flue gas subjected to a wet scrubbing operation.

BACKGROUND OF THE INVENTION

Combustion of fuel sources such as coal produces a waste gas, referred to as "flue gas" that is to be emitted into an environment, such as the atmosphere. The fuel sources typically contain sulfur and sulfur compounds which are converted in the combustion process to gaseous species, including sulfur oxides, which then exist as such in the resulting flue gas. The fuel sources typically also contain elemental mercury or mercury compounds which are converted in the combustion process to, and exist in the flue gas as, gaseous elemental mercury or gaseous ionic mercury species.

As such, flue gas contains particles, noxious substances and other impurities considered to be environmental contaminants. Prior to emission into the atmosphere via a smoke stack, hereinafter a "stack", the flue gas undergoes a cleansing or purification process. In coal combustion, one aspect of this purification process is normally a desulfurization system, such as a wet scrubbing operation commonly known as a wet flue gas desulfurization (WFGD) system.

Sulfur oxides are removed from flue gas using a WFGD system by introducing an aqueous alkaline slurry to a scrubber tower of the WFGD system. The aqueous alkaline slurry typically includes a basic material that will interact with contaminants to remove them from the flue gas. Examples of basic materials that are useful in the aqueous alkaline slurry include lime, limestone, magnesium, combinations thereof and the like.

Recently, there has been an increased focus on the removal of mercury. Presently, there are various methods for removing mercury from flue gas. Those methods include addition of oxidizing agents in a boiler upstream of the flue gas emission control system and then removing the same with scrubbers, addition of reactants to bind mercury and removing the same from the flue gas, and utilization of particular coal or fuel to minimize the amount of mercury released when the coal or fuel is burned.

A number of generally known methods of mercury removal are effective to produce mercury salts, which can be dissolved and removed by the aqueous alkaline slurry used in the wet scrubbing operation. Some of these methods include the addition of halogen or halogen compounds, such as bromine, to the coal or to the flue gas upstream of the wet scrubbing operation to provide oxidation of elemental mercury to ionic mercury and formation of mercury salts, which are then dissolved in the aqueous alkaline slurry incident to the sulfur oxide removal processes. However, the removal of mercury in the aqueous alkaline slurry of a wet scrubber has proven to be difficult to control and it is not easily predicted when designing a flue gas cleaning system with respect to mercury removal. The desired emission guarantee levels are often as low as 0.3 µg/Nm$^3$ of mercury, which corresponds to a very high mercury removal efficiency in the wet scrubber.

SUMMARY OF THE INVENTION

One aspect of the subject matter disclosed herein relates to a method for removing an amount of mercury from a flue gas generated by combustion of a fuel source to reduce mercury emission and/or re-emission to an environment such as the atmosphere. The method includes subjecting the flue gas to a wet scrubbing operation to decrease an amount of sulfur oxides present in the flue gas. The wet scrubbing operation comprises contacting the flue gas with an aqueous alkaline slurry to absorb the sulfur oxides from the flue gas, dissolving at least a portion of gaseous ionic mercury species present in the flue gas in the aqueous alkaline slurry to remove the gaseous ionic mercury species from the flue gas to produce cleaned flue gas, controlling the sulfite concentration in the aqueous alkaline slurry to prevent mercury re-emission into the cleaned flue gas and releasing the cleaned flue gas to the environment. The problem overcome by this method is that once oxidized by the aqueous alkaline slurry, the mercury can under some conditions be reduced to elemental mercury. Elemental mercury has a high vapor pressure and thus can be re-emitted into the "cleaned" flue gas. The present method controls the sulfite concentration in the aqueous alkaline slurry to prevent elemental mercury re-emission into the cleaned flue gas. Using a sulfite sensor, such as that disclosed in WO2013/050990 and incorporated herein in its entirety by reference, sulfite concentration measurements are obtained from the aqueous alkaline slurry. These sulfite concentration measurements are used as a basis for adjusting an amount of oxidation air supplied to the WFGD system thereby modifying the system's oxidation air stoichiometry. As such, the WFGD system's sulfite concentration is controlled to achieve the required mercury emission level at the lowest alkalizing agent additive cost and oxidation air power consumption, without jeopardizing sulfur emission requirements. Lindau, U.S. Pat. No. 7,524,473 incorporated herein in its entirety by reference, also obtained mercury emission reductions by altering oxidation air to control oxidation reduction potential, and thus indirectly sulfite concentration. The subject invention as disclosed herein is an improvement over Lindau in that oxidation reduction potential can be altered by other parameters such as dissolved salt concentrations, giving different readings at similar sulfite concentrations.

BRIEF DESCRIPTION OF THE DRAWINGS

For the purpose of illustrating the subject matter disclosed herein, the drawing shows a form of the embodiment that is presently preferred. However, it should be understood that the disclosed subject matter is not limited to the precise arrangements and instrumentalities shown in the drawing, wherein:

FIG. 1 is a schematic representation of a system for reducing an amount of gaseous elemental mercury emitted in a flue gas, which is practiced using a WFGD system.

DETAILED DESCRIPTION OF THE INVENTION

The present inventors have discovered that using a sulfite probe, such as that disclosed in WO2013/050990 incorporated herein in its entirety by reference, sulfite concentrations of the aqueous alkaline slurry in the WFGD system can be controlled for purposes of controlling and reducing mercury emissions and/or re-emissions of cleaned flue gas. In WFGD systems using limestone for absorption of acid gases and where a gypsum slurry is circulated, the amount of oxidation air blown into the slurry is controlled in order to control the redox potential of the slurry and thereby control mercury emissions. If it is desired to increase the level of mercury emission, the supply of oxidation air is controlled to provide a lesser amount resulting in a lower redox potential and a higher mercury emission. The oxidation air is then controlled by adjusting either higher or lower to provide less than 100% oxidation of sulfite to sulfate and to minimize mercury emissions.

To the contrary, without having to control the redox potential of the aqueous alkaline slurry in the WFGD system, the present method reduces mercury emissions and/or re-emissions in cleaned flue gas through sulfite concentration control. The present method and system for reducing mercury emissions and/or re-emissions in cleaned flue gas through sulfite concentration control are described in detail below.

Referring now to FIG. 1, one embodiment of the subject system 10 is illustrated. System 10 comprises a boiler 12 for the combustion of a carbonaceous fuel 14, such as but not limited to coal. Combustion of the carbonaceous fuel 14 produces a flue gas "FG" comprising acid gases, gaseous heavy metals, particulates and the like, hereafter referred to collectively as contaminants. The flue gas FG flows from outlet 20 of boiler 12 through fluidly connected duct 16 and into inlet 22 of fluidly connected WFGD system 18. Optionally, additional equipment systems known to those skilled in the art may be arranged between boiler 12 and WFGD system 18, but are not described herein for purposes of clarity.

Once inside WFGD system 18, flue gas FG comes into direct contact with an aqueous alkaline slurry 24 to remove contaminants from the flue gas FG. While WFGD system 18 is described herein as a spray tower for purposes of clarity, other types of WFGD systems known to those skilled in the art are equally suitable. Within WFGD system 18, aqueous alkaline slurry 24 is introduced into the WFGD system 18 through one or more nozzles 26 in an upper portion 28 of a scrubber tower 30. As noted above, aqueous alkaline slurry 24 removes contaminants such as sulfur oxides from flue gas FG. Removal of mercury salts is incident to this sulfur oxide removal process. Removal of such contaminants from flue gas FG produces cleaned flue gas "CFG". Cleaned flue gas CFG flows out from WFGD system 18 through outlet 32. From outlet 32, cleaned flue gas CFG may flow to a fluidly connected stack (not shown) or other emissions control apparatus (not shown).

Aqueous alkaline slurry 24 is transported to nozzles 26 from fluidly connected collecting tank 34 via one or more pumps 36 and fluidly connected piping 36a. The amount of aqueous alkaline slurry 24 transported to nozzles 26 depends upon several factors such as but not limited to the amount of flue gas FG present in the scrubber tower 30, the amount of contaminants in the flue gas FG, and/or the design of the WFGD system 18. After the aqueous alkaline slurry 24 directly contacts the flue gas FG and removes contaminants therefrom, the aqueous alkaline slurry 24 is collected in collecting tank 34 for recirculation to nozzles 26 by pumps 36 via piping 36a.

To reduce mercury emission and/or re-emission from the scrubber tower 30, one or more sulfite sensors 38 are arranged in the aqueous alkaline slurry 24 in collecting tank 34. Sulfite sensors 38 measure the sulfite concentration of the aqueous alkaline slurry 24 in collecting tank 34. Sulfite sensors 38 may measure sulfite concentrations either continuously or at predetermined intervals. For example, predetermined intervals for sulfite concentration measurement may be determined automatically by a control device 40 in communication with the sulfite sensors 38, or manually by a user.

Sulfite concentration measurements measured by sulfite sensors 38 are sent as a signal 42 indicative of the measured sulfite concentration(s) to control device 40. Control device 40 may include for example but not limited to a computer, a microprocessor, an application specific integrated circuit, circuitry, or any other device capable of transmitting and receiving electrical signals from various sources, at least temporarily storing data indicated by such signals 42, and perform mathematical and/or logical operations on the data indicated by such signals 42. Control device 40 may include or be connected to a monitor, a keyboard, or other user interface, and includes an associated memory device 44.

Control device 40 compares the measured sulfite concentration(s) to one or more predetermined sulfite concentration values as a set point, which may be stored in memory device 44. It is contemplated that the one or more predetermined sulfite concentration potential values may comprise a single value or a range of values. The predetermined value(s) may be a user-input parameter. For example, the predetermined sulfite concentration values may be from about 300 mg/l to about 500 mg/l or from about 25 mg/l and about 150 mg/l. By "predetermined" it is simply meant that the value is determined before the comparison is made with the actual measured sulfite concentration(s) as measured by the sulfite sensors 38.

Optionally, a mercury measurement device 48 may be used in the subject system to measure mercury emission/re-emission levels. Mercury measurement device 48 is any device suitable to measure elemental mercury emitted from scrubber tower 30. Examples include but are not limited to continuous emission monitors (CEMs), such as cold-vapor atomic absorption spectrometry (CVAAS), cold-vapor atomic fluorescence spectrometry (CVAFS), in-situ ultraviolet differential optical absorption spectroscopy (UVDOAS), and atomic emission spectrometry (AES).

Comparison of the measured sulfite concentration to the one or more predetermined sulfite concentration values causes control device 40 to provide a control signal 50 to a blower 52. Blower 52 adjusts an amount of oxidation air 54, such as oxygen containing gas, which is introduced via fluidly connected piping 52a from fluidly connected oxidation air source 56 into the aqueous alkaline slurry 24 collected in fluidly connected collection tank 34 in response to control signal 50. Oxidation air 54 can be any gas that contains any amount of oxygen, for example but not limited to, air can be used as the oxygen containing gas. Adjusting the amount of oxidation air 54 introduced to fluidly connected collecting tank 34 adjusts the sulfite concentration of the aqueous alkaline slurry 24 present in collecting tank 34.

For example, if the comparison of the measured sulfite concentration and the predetermined sulfite concentration values reveals that the measured sulfite concentration is greater than the predetermined sulfite concentration values, control device 40 may provide a control signal 50 to the blower 52 to cause the blower 52 to increase the amount of oxidation air 54 introduced into collecting tank 34 through input 58. Conversely, if the comparison reveals that the measured sulfite concentration is lower than the predetermined sulfite concentration values, control device 40 may provide a control signal 50 to the blower 52 to cause the blower 52 to decrease the amount of oxidation air 54 introduced into collecting tank 34 through input 58. As such, it is possible to limit levels of emission and/or re-emission of mercury at outlet 32, while minimizing oxidation air 54 consumption. It is contemplated that control device 40 may employ known control algorithms, e.g., proportional, integral, and/or derivative control algorithms, to adjust control signal 50 in response to the comparison of the measured sulfite concentration and the predetermined sulfite concentration values.

Blower 52 may be of any suitable type capable of introducing varying amounts of oxidation air 54 to aqueous alkaline slurry 24 in collecting tank 34. As illustrated in FIG. 1, forced oxidation system 60 includes an inlet vane 62 which operates to regulate the amount of oxidation air 54 entering blower 52 from oxidation air source 56 in response to control signal 50 from control device 40. While the inlet vane 62 is a suitable device for regulating the amount of oxidation air 54 supplied to collecting tank 34, other types of devices and methods could be employed, such as a valve 64 downstream of the blower 52, discharging some air to the atmosphere, or by controlling the speed of the blower 52. Alternatively, spargers, air lance agitators and/or aspirators (not shown) may be employed instead of or in addition to a blower 52. Additionally, force oxidation system 60 may be connected to an agitator (not shown) in collecting tank 34 to distribute oxidation air 54 throughout aqueous alkaline slurry 24.

One method for using system 10 illustrated in FIG. 1 is to supply combustion flue gas to a WFGD system for direct contact with an aqueous alkaline slurry for removal of contaminants from the flue gas. This method comprises measuring a sulfite concentration in the WFGD system for comparison to a predetermined sulfite concentration value, and adjusting an amount of WFGD oxidation air supplied to the system to increase or decrease sulfite concentration to maintain a set point for mercury emission and/or re-emission reduction in produced cleaned flue gas.

Another method for using system 10 illustrated in FIG. 1 is to supply combustion flue gas to a WFGD system for direct contact with an aqueous alkaline slurry for removal of contaminants from the flue gas, measuring a sulfite concentration in the aqueous alkaline slurry of the WFGD system for comparison to a predetermined sulfite concentration value, and adjusting one or more WFGD system parameters to increase or decrease sulfite concentration to reduce mercury emission and/or re-emission in produced cleaned flue gas.

Another method for using system 10 illustrated in FIG. 1 is to supply combustion flue gas to a WFGD system for direct contact with an aqueous alkaline slurry for removal of contaminants from the flue gas, measuring a mercury concentration in the WFGD system for comparison to a predetermined mercury concentration value, and adjusting one or more WFGD sulfite concentration set points to reduce mercury emission and/or re-emission in produced cleaned flue gas.

Although the subject matter has been described and illustrated with respect to exemplary embodiments thereof, it is understood by those skilled in the art that the foregoing and various other changes, omissions and additions may be made therein and thereto, without parting from the spirit and scope of the disclosed method and system. Accordingly, other embodiments are within the scope of the following appended claims.

What is claimed is:

1. A method for reducing mercury emission or re-emission levels in a cleaned combustion flue gas comprises:
   supplying a combustion flue gas to a WFGD system for direct contact with an aqueous alkaline slurry for removal of contaminants from the flue gas to produce a cleaned flue gas,
   measuring a sulfite concentration using a sulfite sensor in the WFGD system for comparison to a predetermined sulfite concentration value,
   measuring mercury levels using a mercury measurement device in the WFGD system, and
   adjusting a WFGD system parameter to increase or decrease sulfite concentration to reduce levels of mercury emission and/or re-emission in the produced cleaned flue gas based on obtained measurements.

2. The method according to claim 1, wherein the sulfite concentration is measured in the aqueous alkaline slurry of the WFGD system.

3. The method according to claim 1, wherein the sulfite concentration is measured in the aqueous alkaline slurry of a spray tower type WFGD system.

4. The method according to claim 1, wherein mercury levels are measured in an outlet of the WFGD system for comparison to a predetermined mercury value, prior to
   adjusting a WFGD system parameter to increase or decrease sulfite concentration to reduce mercury emission and/or re-emission in the produced cleaned flue gas, based on the mercury concentration.

5. The method according to claim 1, further comprising
   supplying an amount of an oxidation air to the aqueous alkaline slurry to adjust a WFGD system to decrease the sulfite concentration thereof to reduce levels of mercury emission and/or re-emission in the produced cleaned flue gas.

6. A system for reducing mercury emission or re-emission levels in a cleaned combustion flue gas comprises:
   a WFGD system with an aqueous alkaline slurry for direct contact with a combustion flue gas flowing therethrough,
   a collection tank for collecting the aqueous alkaline slurry following direct contact with the combustion flue gas with one or more sulfite sensors arranged therein for measuring a sulfite concentration in the collected aqueous alkaline slurry to obtain a measured sulfite concentration,
   a mercury measurement device for measuring mercury levels in cleaned flue gas produced by the WFGD system,
   a control device to compare the measured mercury levels and the measured sulfite concentration to a predetermined sulfite concentration and based thereon control a device, and
   a device controlled by the control device for adjusting a WFGD system parameter to increase or decrease sulfite concentration to reduce levels of mercury emission and/or re-emission in the produced cleaned flue gas.

7. The system of claim 6, wherein the mercury measurement device is arranged in an outlet of the WFGD system for measuring mercury levels in the cleaned flue gas flowing therethrough to obtain a measured mercury level therefrom.

8. The system of claim 6, wherein the mercury measurement device is arranged in an outlet of the WFGD system for measuring mercury levels in the cleaned flue gas flowing therethrough to obtain a measured mercury level therefrom,
   a control device to compare the measured mercury level to a predetermined mercury level and based thereon control a device, and
   a device controlled by the control device for adjusting a WFGD system parameter to increase or decrease sulfite concentration in the aqueous alkaline slurry to reduce levels of mercury emission and/or re-emission in a produced cleaned flue gas.

9. The system according to claim 6, wherein the WFGD system parameter adjusted is an amount of oxidation air supplied to the WFGD system.

10. The system according to claim 6, further comprising
    a blower controlled by the control device for transporting an amount of oxidation air to the WFGD system.

11. The system according to claim 6, further comprising
    a blower controlled by the control device for transporting an amount of oxidation air to the aqueous alkaline slurry of the WFGD system.

12. The system according to claim 6, further comprising
    a blower to transport an amount of oxidation air to the aqueous alkaline slurry to decrease the sulfite concentration therein to reduce levels of mercury emission and/or re-emission in the produced cleaned flue gas.

* * * * *